US007044220B2

(12) United States Patent
Nguyen et al.

(10) Patent No.: US 7,044,220 B2
(45) Date of Patent: May 16, 2006

(54) COMPOSITIONS AND METHODS FOR IMPROVING PROPPANT PACK PERMEABILITY AND FRACTURE CONDUCTIVITY IN A SUBTERRANEAN WELL

(75) Inventors: Philip D. Nguyen, Duncan, OK (US); Bradley L. Todd, Duncan, OK (US); Trinidad Munoz, Jr., Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 156 days.

(21) Appl. No.: 10/608,291

(22) Filed: Jun. 27, 2003

(65) Prior Publication Data

US 2004/0261995 A1 Dec. 30, 2004

(51) Int. Cl.
*E21B 43/267* (2006.01)
*E21B 33/138* (2006.01)

(52) U.S. Cl. .............................. 166/280.2; 166/280.1; 166/281; 166/300; 507/209; 507/211; 507/219; 507/220; 507/260; 507/273; 507/906; 507/924; 523/131

(58) Field of Classification Search ................ 166/276, 166/278, 280.1, 280.2, 281, 295, 300, 308.1, 166/308.2; 507/209, 211, 219, 220, 260, 507/273, 924, 906; 523/130, 131
See application file for complete search history.

(56) References Cited

U.S. PATENT DOCUMENTS

| 2,238,671 | A |   | 4/1941  | Woodhouse ................ 166/21 |
| 2,703,316 | A |   | 3/1955  | Palmer ..................... 260/78.3 |
| 3,173,484 | A | * | 3/1965  | Huitt et al. .............. 166/280.1 |
| 3,195,635 | A | * | 7/1965  | Fast ........................ 166/280.1 |
| 3,272,650 | A |   | 9/1966  | MacVittie ..................... 134/7 |
| 3,302,719 | A | * | 2/1967  | Fischer ................... 166/280.2 |
| 3,364,995 | A | * | 1/1968  | Atkins et al. ............ 166/280.1 |
| 3,366,178 | A | * | 1/1968  | Malone et al. ........... 166/280.1 |
| 3,455,390 | A | * | 7/1969  | Gallus ..................... 166/295 |
| 3,784,585 | A |   | 1/1974  | Schmitt et al. ............. 260/861 |
| 3,819,525 | A |   | 6/1974  | Hattenbrun ................ 252/132 |
| 3,828,854 | A |   | 8/1974  | Templeton et al. ......... 166/307 |
| 3,868,998 | A |   | 3/1975  | Lybarger et al. ........... 166/278 |
| 3,912,692 | A |   | 10/1975 | Casey et al. .............. 260/78.3 |
| 3,948,672 | A |   | 4/1976  | Harnsberger ............... 106/720 |
| 3,955,993 | A |   | 5/1976  | Curtice et al. ............. 106/662 |
| 3,960,736 | A |   | 6/1976  | Free et al. |
| 3,968,840 | A | * | 7/1976  | Tate ........................ 166/280.1 |
| 3,998,744 | A | * | 12/1976 | Arnold et al. .............. 507/269 |
| 4,068,718 | A | * | 1/1978  | Cooke et al. ............. 166/280.2 |
| 4,169,798 | A |   | 10/1979 | DeMartino |
| 4,172,066 | A |   | 10/1979 | Zweigle et al. ....... 260/29.6 TA |
| 4,387,769 | A |   | 6/1983  | Erbstoesser et al. ........ 507/219 |
| 4,460,052 | A |   | 7/1984  | Gockel ........................ 175/72 |
| 4,470,915 | A |   | 9/1984  | Conway |
| 4,498,995 | A |   | 2/1985  | Gockel |
| 4,526,695 | A |   | 7/1985  | Erbstoesser et al. ........ 507/219 |
| 4,694,905 | A |   | 9/1987  | Armbruster ................ 166/280 |
| 4,715,967 | A |   | 12/1987 | Bellis et al. |
| 4,716,964 | A |   | 1/1988  | Erbstoesser et al. ........ 166/284 |
| 4,785,884 | A |   | 11/1988 | Armbruster ................ 166/280 |
| 4,797,262 | A |   | 1/1989  | Dewitz ....................... 422/142 |
| 4,809,783 | A |   | 3/1989  | Hollenbeck et al. ........ 166/307 |
| 4,817,721 | A |   | 4/1989  | Pober ......................... 166/295 |
| 4,843,118 | A |   | 6/1989  | Lai et al. .................... 524/555 |
| 4,848,467 | A |   | 7/1989  | Cantu et al. ................ 166/281 |
| 4,886,354 | A |   | 12/1989 | Welch et al. ................. 356/70 |
| 4,957,165 | A |   | 9/1990  | Cantu et al. ................ 166/295 |
| 4,961,466 | A |   | 10/1990 | Himes et al. |
| 4,986,353 | A |   | 1/1991  | Clark et al. ................. 166/279 |
| 4,986,354 | A |   | 1/1991  | Cantu et al. ................ 166/279 |
| 4,986,355 | A |   | 1/1991  | Casad et al. ................ 166/295 |
| 5,082,056 | A |   | 1/1992  | Tackett, Jr. ................. 166/295 |
| 5,142,023 | A |   | 8/1992  | Gruber et al. .............. 528/354 |
| 5,216,050 | A |   | 6/1993  | Sinclair ...................... 524/108 |
| 5,247,059 | A |   | 9/1993  | Gruber et al. .............. 528/354 |
| 5,249,628 | A |   | 10/1993 | Surjaatmadja |
| 5,295,542 | A |   | 3/1994  | Cole et al. .................. 166/278 |
| 5,325,923 | A |   | 7/1994  | Surjaatmadja et al. |
| 5,330,005 | A |   | 7/1994  | Card et al. |
| 5,359,026 | A |   | 10/1994 | Gruber ....................... 528/354 |
| 5,360,068 | A |   | 11/1994 | Sprunt et al. ............... 166/259 |
| 5,363,916 | A |   | 11/1994 | Himes et al. ............... 166/276 |
| 5,373,901 | A |   | 12/1994 | Norman et al. ............. 166/300 |

(Continued)

FOREIGN PATENT DOCUMENTS

EP 0 510 762 A2 4/1992

(Continued)

OTHER PUBLICATIONS

U.S. Appl. No. 10/947,427, filed Sep. 20, 2004, Blauch et al.

(Continued)

*Primary Examiner*—George Suchfield
(74) *Attorney, Agent, or Firm*—Robert A. Kent; Baker Botts

(57) ABSTRACT

The present invention relates to enhancing fluid flow from subterranean formations. More particularly, this invention relates to providing improved proppant matrixes within fractures in a subterranean formation. An example of the methods of increasing the conductivity of a fracture in a subterranean formation comprises the steps of providing a fracturing treatment fluid comprising a proppant composition, the proppant composition comprising proppant particulates and a degradable material capable of undergoing an irreversible degradation downhole; introducing the proppant composition to the fracture; and allowing the proppant composition to form a proppant matrix having voids in the fracture.

73 Claims, No Drawings

U.S. PATENT DOCUMENTS

| | | | | |
|---|---|---|---|---|
| 5,386,874 A | 2/1995 | Laramay et al. | | 166/300 |
| 5,396,957 A | 3/1995 | Surjaatmadja et al. | | |
| 5,402,846 A | 4/1995 | Jennings, Jr. et al. | | 166/259 |
| 5,439,055 A | 8/1995 | Card et al. | | |
| 5,460,226 A | 10/1995 | Lawson et al. | | 166/300 |
| 5,464,060 A | 11/1995 | Hale et al. | | 166/293 |
| 5,475,080 A | 12/1995 | Gruber et al. | | 528/354 |
| 5,484,881 A | 1/1996 | Gruber et al. | | 528/354 |
| 5,497,830 A | 3/1996 | Boles et al. | | 166/300 |
| 5,499,678 A | 3/1996 | Surjaatmadja et al. | | 166/298 |
| 5,505,787 A | 4/1996 | Yamaguchi | | 134/4 |
| 5,512,071 A | 4/1996 | Yam et al. | | 51/307 |
| 5,536,807 A | 7/1996 | Gruber et al. | | 528/354 |
| 5,591,700 A | 1/1997 | Harris et al. | | 507/204 |
| 5,594,095 A | 1/1997 | Gruber et al. | | 528/354 |
| 5,604,186 A | 2/1997 | Hunt et al. | | 507/204 |
| 5,607,905 A | 3/1997 | Dobson, Jr. et al. | | 507/211 |
| 5,670,473 A | 9/1997 | Scepanski | | 510/445 |
| 5,698,322 A | 12/1997 | Tsai et al. | | 428/373 |
| 5,765,642 A | 6/1998 | Surjaatmadja | | 166/297 |
| 5,791,415 A | 8/1998 | Nguyen et al. | | 166/280 |
| 5,833,000 A | 11/1998 | Weaver et al. | | 166/276 |
| 5,839,510 A | 11/1998 | Weaver et al. | | 166/276 |
| 5,849,401 A | 12/1998 | El-Afandi et al. | | 428/215 |
| 5,853,048 A | 12/1998 | Weaver et al. | | 166/279 |
| 5,893,416 A | 4/1999 | Read | | 166/304 |
| 5,908,073 A | 6/1999 | Nguyen et al. | | 166/276 |
| 5,924,488 A | 7/1999 | Nguyen et al. | | 166/280 |
| 5,964,291 A | 10/1999 | Bourne et al. | | 166/279 |
| 6,004,400 A | 12/1999 | Bishop et al. | | 134/2 |
| 6,024,170 A | 2/2000 | McCabe et al. | | 166/300 |
| 6,028,113 A | 2/2000 | Scepanski | | 514/643 |
| 6,047,772 A | 4/2000 | Weaver et al. | | 166/276 |
| 6,059,034 A | 5/2000 | Rickards et al. | | 166/280 |
| 6,114,410 A | 9/2000 | Betzold | | 523/130 |
| 6,123,965 A | 9/2000 | Jacob et al. | | 424/489 |
| 6,131,661 A | 10/2000 | Conner et al. | | 166/300 |
| 6,135,987 A | 10/2000 | Tsai et al. | | 604/365 |
| 6,143,698 A | 11/2000 | Murphey et al. | | 507/145 |
| 6,162,766 A | 12/2000 | Muir et al. | | 507/267 |
| 6,169,058 B1 | 1/2001 | Le et al. | | 507/222 |
| 6,172,011 B1 | 1/2001 | Card et al. | | 507/204 |
| 6,189,615 B1 | 2/2001 | Sydansk | | 166/270 |
| 6,202,751 B1 | 3/2001 | Chatterji et al. | | 166/276 |
| 6,209,643 B1 | 4/2001 | Nguyen et al. | | 166/276 |
| 6,209,646 B1 | 4/2001 | Reddy et al. | | 166/300 |
| 6,214,773 B1 | 4/2001 | Harris et al. | | 507/271 |
| 6,242,390 B1 | 6/2001 | Mitchell et al. | | 507/211 |
| 6,260,622 B1 | 7/2001 | Blok et al. | | 166/305.1 |
| 6,311,773 B1 | 11/2001 | Todd et al. | | 166/280 |
| 6,323,307 B1 | 11/2001 | Bigg et al. | | 528/354 |
| 6,326,458 B1 | 12/2001 | Gruber et al. | | 528/354 |
| 6,328,105 B1 | 12/2001 | Betzold | | 166/280 |
| 6,357,527 B1 | 3/2002 | Norman et al. | | 166/300 |
| 6,364,945 B1 | 4/2002 | Chatterji et al. | | 106/677 |
| 6,387,986 B1 | 5/2002 | Moradi-Araghi et al. | | 523/211 |
| 6,390,195 B1 | 5/2002 | Nguyen et al. | | 166/276 |
| 6,394,185 B1 | 5/2002 | Constien | | 166/296 |
| 6,422,314 B1 | 7/2002 | Todd et al. | | 166/312 |
| 6,439,309 B1 | 8/2002 | Matherly et al. | | 166/276 |
| 6,454,003 B1 | 9/2002 | Chang et al. | | 166/270 |
| 6,485,947 B1 | 11/2002 | Rajgarhia et al. | | 435/139 |
| 6,488,091 B1 | 12/2002 | Weaver et al. | | 166/300 |
| 6,488,763 B1 | 12/2002 | Brothers et al. | | 106/692 |
| 6,494,263 B1 | 12/2002 | Todd | | 166/312 |
| 6,508,305 B1 | 1/2003 | Brannon et al. | | 166/293 |
| 6,527,051 B1 | 3/2003 | Reddy et al. | | 166/300 |
| 6,554,071 B1 | 4/2003 | Reddy et al. | | 166/293 |
| 6,569,814 B1 | 5/2003 | Brady et al. | | 507/201 |
| 6,599,863 B1 | 7/2003 | Palmer et al. | | 507/219 |
| 6,667,279 B1 | 12/2003 | Hessert et al. | | 507/225 |
| 6,669,771 B1 | 12/2003 | Tokiwa et al. | | 106/162 |
| 6,681,856 B1 | 1/2004 | Chatterji et al. | | 166/294 |
| 6,686,328 B1 | 2/2004 | Binder | | 510/446 |
| 6,710,019 B1 | 3/2004 | Sawdon et al. | | 507/136 |
| 6,761,218 B1 | 7/2004 | Nguyen et al. | | 166/278 |
| 2001/0016562 A1 | 8/2001 | Muir et al. | | 507/201 |
| 2002/0036088 A1 | 3/2002 | Todd | | 166/300 |
| 2002/0125012 A1 | 9/2002 | Dawson et al. | | 166/300 |
| 2003/0060374 A1 | 3/2003 | Cooke, Jr. | | 507/200 |
| 2003/0114314 A1 | 6/2003 | Ballard et al. | | 507/100 |
| 2003/0130133 A1 | 7/2003 | Vallmer | | 507/100 |
| 2003/0188766 A1 | 10/2003 | Banerjee et al. | | 134/7 |
| 2003/0234103 A1 | 12/2003 | Lee et al. | | 166/293 |
| 2004/0014607 A1 | 1/2004 | Sinclair et al. | | 507/200 |
| 2004/0040706 A1 | 3/2004 | Hossaini et al. | | 166/278 |
| 2004/0055747 A1 | 3/2004 | Lee | | 166/278 |
| 2004/0106525 A1 | 6/2004 | Willbert et al. | | 507/200 |
| 2004/0138068 A1 | 7/2004 | Rimmer et al. | | 507/100 |
| 2004/0152601 A1 | 8/2004 | Still et al. | | 507/100 |
| 2004/0152602 A1 | 8/2004 | Boles | | 507/100 |
| 2004/0231845 A1 | 11/2004 | Cooke, Jr. | | 166/279 |
| 2004/0261993 A1 | 12/2004 | Nguyen | | 166/276 |
| 2004/0261995 A1 | 12/2004 | Nguyen et al. | | 166/279 |
| 2004/0261996 A1 | 12/2004 | Munoz, Jr. et al. | | 166/279 |
| 2004/0261999 A1 | 12/2004 | Nguyen | | 166/292 |
| 2005/0006095 A1 | 1/2005 | Justus et al. | | 166/295 |

FOREIGN PATENT DOCUMENTS

| | | |
|---|---|---|
| EP | 0 879 935 A2 | 11/1998 |
| EP | 0 879 935 A3 | 10/1999 |
| GB | 2 348 907 A | 10/2000 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 2000/57022 | 9/2000 |
| WO | WO 2001/02698 | 1/2001 |
| WO | WO 01/87797 A1 | 11/2001 |
| WO | WO 02/12674 A1 | 2/2002 |
| WO | WO 03/027431 | 4/2003 |
| WO | WO 03/027431 A2 | 4/2003 |
| WO | WO 03/027431 A3 | 4/2003 |
| WO | WO 2004/007905 | 1/2004 |
| WO | WO 04/037946 A1 | 5/2004 |
| WO | WO 04/038176 A1 | 5/2004 |

OTHER PUBLICATIONS

Foreign Search Report and Opinion (PCT Appl. No. GB2004/002719), Jun. 24, 2004.

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications,* Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Blauch, et al, *Aqueous Tackifier and Methods of Controlling Particulates*, U.S. Appl. No. 10/864,061, filed Jun. 9, 2004.

Blauch, et al, *Aqueous-Based Tackifier Fluids and Methods of Use*, U.S. Appl. No. 10/864,618, filed Jun. 9, 2004.

"Poly (phenyllactide): Synthesis, Characterization, and Hydrolytic Degradation" published in Biomacromolecules, vol. 2, No. 3, 2001, pp. 658-663 by Tara L. Simmons and Gregory L. Baker.

"Synthesis and Properties of Polymers Derived from Substituted Lactic Acids" published in 2001 American Chemical Society, Chapter 12, pp. 147-159 by Mao Yin, Tara L. Simmons and Gregory L. Baker.

"Preparation and Characterization of Substituted Polylactides" published in 199 American Chemical Society, vol. 32, No. 23, pp. 7711-7718 by Mao Yin and Gregory L. Baker.

Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.

M. Ahmad, et al.: Ortho Ester Hydrolysis: Direct Evidence for a Three-Stage Reaction Mechanism, Engineering Information Inc., NY, NY, vol. 101, No. 10 (XP-002322843), May 9, 1979.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71, 2001*, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug., 1981, vol. 21, No. 11 (pp. 727-731).

Cordes, et al., *Mechanism and Catalysis for Hydrolysis of Acetals, Ketals, and Other Esters,* Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

\* cited by examiner

COMPOSITIONS AND METHODS FOR IMPROVING PROPPANT PACK PERMEABILITY AND FRACTURE CONDUCTIVITY IN A SUBTERRANEAN WELL

BACKGROUND OF THE INVENTION

1. Field of the Invention

The present invention relates to enhancing fluid flow from subterranean formations. More particularly, this invention relates to providing improved proppant matrixes within fractures in a subterranean formation.

2. Description of the Prior Art

Hydraulic fracturing is a technique for stimulating the production of a subterranean formation. The technique normally involves (1) injecting a viscous liquid through a wellbore into a formation at a chosen rate and pressure to overcome the earth's stresses and form a fracture in the formation; and (2) placing proppant particulates in the fracture to, inter alia, maintain the fracture in a propped condition when the injection pressure is released. The resultant propped fracture provides a conductive channel in the formation for fluids to flow to the wellbore.

The degree of stimulation afforded by the hydraulic fracture treatment is largely dependent on the permeability and width of the propped fracture. Thus, the productivity of the well in effect becomes a function of fracture conductivity. To enhance well productivity, it may be necessary to enhance fracture conductivity.

Oftentimes, to effectively prop open the fractures as well as prevent proppant particulate flowback, the proppant particulates are caused to consolidate into proppant matrixes within the fractures. One conventional means of doing this is to use resin-coated proppant particulates so that when the resin cures downhole, the proppant particulates can consolidate into a mass within the fractures. Other methods have also been used to facilitate the consolidation of the proppant particulates within the fractures.

Although consolidating the proppant particulates within a fracture may have some benefits, for example preventing proppant particulate flowback, such methods may adversely affect the conductivity of the fracture. That is, some methods of consolidating proppant particulates themselves may introduce a barrier to the free flow of fluids from the subterranean formation to the wellbore for subsequent production. Fracture conductivity may suffer as a result. This is undesirable as this may affect overall well productivity.

To counteract this potential problem, many different techniques have been developed. One technique involves adding calcium carbonate or salt to the proppant composition. When the proppant particulates consolidate, after a subsequent fluid is added to the wellbore, the calcium carbonate or salt is dissolved out of the matrix. At least one problem associated with this method is the incomplete removal of the calcium carbonate or salt if not adequately contacted with the subsequent fluid. Another method has been to add wax beads to the proppant composition. Once incorporated into the consolidated prop pant particulates, the wax beads melt as a result of the temperature of the formation. A problem with this method is that the wax may re-solidify in the well causing countless problems. Another method that has been used is to add an oil-soluble resin to the proppant composition, however, this method has not been successful because of, inter alia, nonuniform removal of the particles.

Another way to address fracture conductivity and proppant matrix permeability has been to use bigger proppant particulates. However, there are practical limits to the size of the proppant that may be used. For instance, if too large of particles are used, premature screen out at the perforations and/or fractures during the proppant stage of fracturing treatment often occurs as large size proppant particulates are being injected into the fractures. In addition, by using too large of proppant particles, the ability to control formation sand is lost as the formation sand or fines tend to invade or penetrate the large pore space of the proppant pack during production of hydrocarbons, thus choking the flow paths of the fluids.

SUMMARY OF THE INVENTION

The present invention relates to enhancing fluid flow from subterranean formations. More particularly, this invention relates to providing improved proppant matrixes within fractures in a subterranean formation.

An example of the methods of the present invention of increasing the conductivity of a fracture in a subterranean formation comprises the steps of providing a fracturing treatment fluid comprising a proppant composition, the proppant composition comprising proppant particulates and a degradable material capable of undergoing an irreversible degradation downhole; introducing the proppant composition to the fracture; and allowing the proppant composition to form a proppant matrix having voids in the fracture.

An example of the proppant compositions of the present invention comprises proppant particulates, and a degradable material that undergoes an irreversible degradation downhole.

The objects, features and advantages of the present invention will be readily apparent to those skilled in the art upon a reading of the description of the preferred embodiments which follows.

DESCRIPTION OF PREFERRED EMBODIMENTS

The present invention provides improved compositions and methods for enhancing fluid flow from a subterranean formation. In preferred embodiments, the present invention provides compositions and methods for enhancing subterranean well productivity by enhancing fracture conductivity. The compositions and methods of the present invention may be used to enhance the permeability of proppant matrixes within fractures so that fluids from the subterranean formation may flow more freely to the wellbore without negatively affecting the ability of the proppant matrix to perform other desired functions within the fracture, e.g., maintaining the integrity of a fracture or providing a sand control means.

The proppant compositions of the present invention may be used in conjunction with any suitable fracturing fluid. These compositions comprise proppant particulates and a degradable material capable of undergoing an irreversible degradation downhole. The term "irreversible" as used herein means that the degradable material once degraded downhole, it should not recrystallize or reconsolidate while downhole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation.

Any proppant particulate suitable for use in subterranean applications is suitable for use in the compositions and methods of the present invention. For instance, natural sand, ground walnut hulls, man-made proppants, including bauxite, ceramics, polymeric materials, or the like are suitable. Suitable sizes range from 4 to 100 U.S. mesh, but are preferably in the range of 10 to 60 US mesh. In some embodiments, the proppant particulates may be coated with a curable resin. Even though using proppant particulates that have been coated with curable resin is preferable, the methods of the present invention are applicable for use with uncoated proppant particulates.

If a curable resin is used, the proppant particulates can either be precoated or coated on-the-fly with a curable resin. Any type of curable resin that will enable the proppant particulates to consolidate within a fracture in the formation is suitable for use in the present invention, e.g., epoxies, furan, phenolics, furfuryl aldehyde, furfuryl alcohol, or mixtures thereof. If a curable resin is utilized, preferably the proppant particulates are coated with a curable resin prior to being mixed with the degradable material. Any portion of the proppant particulates may be coated with a curable resin. For instance, just the tail-end portion, the first portion and the tail-end portion, or the entirety of the proppant particulates may be coated. In certain embodiments, at least a majority of the proppant particulates are coated with curable resin and allowed to consolidate in-situ to form a hardenable mass.

Alternatively, a tackifying agent could be used rather than a curable resin. If used, the tackifying agent is preferably but not necessarily incorporated with the proppant particulates before they are mixed with the degradable material. The tackifying agent, inter alia, helps distribute the degradable material within the proppant composition and keep it in place within the proppant matrix. Using a tackifier as opposed to a curable resin could be especially useful if the degradable material utilized has a low density or specific gravity or has a substantially different particle size than the proppant particulates. In one embodiment of the present invention, the tackifying agent is coated onto the proppant particulates early in the proppant stage of the fracturing treatment. Then, resin-coated proppant particulates are used during the tail-in stage of the fracturing treatment. In another embodiment, the tackifying agent and the curable resin are coated on the proppant particulates intermittently.

In any event, to appreciate some of the beneficial effects of the present invention, the proppant particulates should consolidate within a fracture in the formation to form a proppant matrix. The term "proppant matrix" as used herein simply refers to a consolidation of proppant within a fracture adjacent to a wellbore in a subterranean formation. The mechanism by which the proppant matrix consolidates within the fracture is not important, e.g., a curable resin, or a tackifying agent. Any suitable method can be used, including mechanical methods, e.g., interlocking proppant particulates. Thus, in a preferred embodiment, the removal of the degradable material occurs after the proppant matrix has developed some substantial compressive strength or stability inside the fracture to minimize shifting or rearrangement of proppant particulates within the pack.

The degradable material is incorporated in the proppant composition and becomes distributed throughout the proppant matrix, most preferably uniformly, as the proppant matrix forms. After the requisite time period dictated by the characteristics of the particular degradable material utilized, the degradable material undergoes an irreversible degradation. This degradation, in effect, causes the degradable material to substantially be removed from the proppant matrix. As a result, voids are created in the proppant matrix. These voids enhance the permeability of the matrix, which results, inter alia, in enhanced conductivity. Enhanced fracture conductivity enhances well productivity, as well productivity is a function, inter alia, of fracture conductivity.

Nonlimiting examples of degradable materials that may be used in conjunction with the present invention include but are not limited to degradable polymers, dehydrated salts, and/or mixtures of the two.

As for degradable polymers, a polymer is considered to be "degradable" herein if the degradation is due to, inter alia, chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable polymers include polysaccharides such as dextran or cellulose; chitins; chitosans; proteins; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred.

Aliphatic polyesters degrade chemically, inter alia, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polyester matrices more bulk eroding.

Suitable aliphatic polyesters have the general formula of repeating units shown below:

Formula I

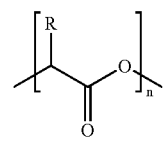

where n is an integer between 75 and 10,000 and R is selected from the group consisting of hydrogen, alkyl, aryl, alkylaryl, acetyl, heteroatoms, and mixtures thereof. Of the suitable aliphatic polyesters, poly(lactide) is preferred. Poly (lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide are defined by the formula:

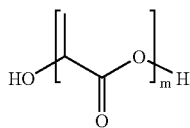

Formula II where m is an integer $2 \leq m \leq 75$. Preferably m is an integer and $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable particulate is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used in the present invention by, inter alia, blending, copolymerizing or otherwise mixing the stereoisomers, blending, copolymerizing or otherwise mixing high and low molecular weight polylactides, or by blending, copolymerizing or otherwise mixing a polylactide with another polyester or polyesters.

Plasticizers may be present in the polymeric degradable materials of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers include but are not limited to derivatives of oligomeric lactic acid, selected from the group defined by the formula:

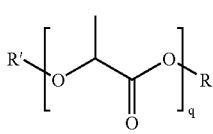

Formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer and $2 \leq q \leq 75$; and mixtures thereof. Preferably q is an integer and $2 \leq q \leq 10$. As used herein the term "derivatives of oligomeric lactic acid" includes derivatives of oligomeric lactide. In addition to the other qualities above, the plasticizers may enhance the degradation rate of the degradable polymeric materials. The plasticizers, if used, are preferably at least intimately incorporated within the degradable polymeric materials.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of particularly suitable degradable polymer useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly (suberic anhydride), poly(sebacic anhydride), and poly (dodecanedioic anhydride). Other suitable examples include but are not limited to poly(maleic anhydride) and poly (benzoic anhydride).

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material utilized can be further tailored by blending, and copolymerizing it with another polymer, or by a change in the macromolecular architecture (e.g., hyperbranched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate degradable polymer to achieve the desired physical properties of the degradable polymers.

Dehydrated salts may be used in accordance with the present invention as a degradable material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include but are not limited to anhydrous sodium tetraborate (also known as anhydrous borax), and anydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one should consider the degradation products that will result. These degradation products should not adversely affect other operations or components. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

Also, we have found that a preferable result is achieved if the degradable material degrades slowly over time as opposed to instantaneously. Even more preferable results have been obtained when the degradable material does not begin to degrade until after the proppant matrix has developed some compressive strength. The slow degradation of the degradable material, inter alia, helps to maintain the stability of the proppant matrix.

If the application in which the degradable material will be used does not contain a component that will enable the degradable material to degrade, e.g., in a dry gas hole, then in alternative embodiments of the present invention, the degradable material can be mixed with inorganic or organic compound to form what is referred to herein as a composite. In preferred alternative embodiments, the inorganic or organic compound in the composite is hydrated. Examples of the hydrated organic or inorganic solid compounds that can be utilized in the self-degradable diverting material include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers. Of these, sodium acetate trihydrate is preferred. The lactide units of the aliphatic polyester and the releasable water of the organic or inorganic solid compound utilized are preferably present in the mixture in equal molar amounts. The degradable material is then in a sense self-degradable, in that the degradable should at least partially degrade in the releasable water provided by the hydrated organic or inorganic compound which dehydrates over time when heated in the subterranean zone.

The specific features of the degradable material may be chosen or modified to provide the proppant matrix with optimum conductivity while maintaining its desirable filtering capability. Preferably, the degradable material is selected to have a size, and shape similar to the size and shape of the curable proppant particulates to help maintain substantial uniformity Within the mixture. It is preferable if the proppant particulates and the degradable material do not segregate within the proppant composition. Whichever degradable material is utilized, the degradable materials may have any shape, depending on the desired characteristics of the resultant voids in the proppant matrix including but not limited to particles having the physical shape of platelets, shavings, flakes, ribbons, rods, strips, spheroids, toroids, pellets, tablets, or any other physical shape. The physical shape of the degradable material should be chosen so as to enhance the desired shape and relative composition of the resultant voids within the proppant matrix. For example, a rod-like particle shape may be suitable in applications wherein channel-like voids in the proppant matrix are desired. One of ordinary skill in the art with the benefit of this disclosure will recognize the specific degradable material and the preferred size and shape for a given application.

The proppant composition can either be pre-blended and then transported to the well site, or it can be prepared on-the-fly at the well site and then introduced downhole. Preferably, the proppant particles and the degradable material should be mixed so as to form a uniform cohesive mixture in the fracturing treatment fluid. Any conventional fracturing fluid may be used in accordance with the present invention.

The concentration of the degradable material in the proppant composition ranges from about 0.1% to about 30%, based on the weight of the proppant in the mixture. A concentration of degradable material between about 1% and about 5% by weight of the proppant is preferable. Additionally, the relative amounts of the degradable material in the proppant composition should not be such that when degraded, an undesirable percentage of voids result in the proppant matrix making the proppant matrix potentially ineffective in maintaining the integrity of the fracture. One of ordinary skill in the art with the benefit of this disclosure will recognize an optimum concentration of degradable material that provides desirable values in terms of enhanced conductivity or permeability without undermining the stability of the proppant pack itself.

To facilitate a better understanding of the present invention, the following examples of preferred embodiments are given. In no way should such examples be read to limit the scope of the invention.

EXAMPLES

Proppant matrixes were formed by mixing 20/40-mesh bauxite proppant with various amounts of degradable material, specifically polylactic acid. 250 grams of proppant was first coated with 11 ml of a curable epoxy resin. Polylactic acid particulates were then added to the resin-coated proppant and blended thoroughly to form a homogeneous blend. The amounts of polylactic acid added to each composition were 0%, 5%, and 10% and 20% by weight of the proppant particulates in the composition. Mixing the mixture with water formed a slurry. The slurry was then packed into a brass flow cell and placed in an oven to be cured under a 500-psi stress load at 275° F. for 4 days. After this curing period, permeability testing was performed for the consolidated proppant matrixes. Table 1 reports the resulting permeability values obtained for the proppant matrixes.

TABLE 1

| Amount of Polylactic Acid Particulate Added to the Proppant (weight %) | Proppant Pack Permeability (Darcies) |
| --- | --- |
| 0 | 52 |
| 5 | 100 |
| 10 | 163 |
| 20 | 167 |

As can be seen from Table 1, the permeability of the proppant matrix was enhanced by the addition of the degradable material, specifically polylactic acid particulate. This enhancement increased with the percentage by weight of the degradable material utilized.

Thus, the present invention is well adapted to carry out the objects and attain the ends and advantages mentioned as well as those which are inherent therein. While numerous changes may be made by those skilled in the art, such changes are encompassed within the spirit and scope of this invention as defined by the appended claims.

What is claimed is:

1. A method of increasing the conductivity of a fracture in a subterranean formation comprising the steps of:
    providing a fracturing treatment fluid comprising a proppant composition, the proppant composition comprising proppant particulates and a degradable material that comprises one or more poly(orthoesters);
    introducing the proppant composition to the fracture; and
    allowing the proppant composition to form a proppant matrix having voids in the fracture.

2. The method of claim 1 wherein the proppant particulates are selected from the group consisting of sand, walnut hulls, man-made proppant particulates and combinations thereof.

3. The method of claim 1 wherein the proppant particulates have a size of about 10 to about 60 US mesh.

4. The method of claim 1 wherein the proppant composition further comprises a curable resin, a tackifying agent, or both.

5. The method of claim 4 wherein the curable resin is selected from the group consisting of epoxies, furans, phenolics, furfuryl aldehydes, furfuryl alcohols, and combinations thereof.

6. The method of claim 1 wherein the proppant composition comprises interlocking proppant particulates.

7. The method of claim 1 wherein the degradable material further comprises a degradable polymer or a dehydrated salt.

8. The method of claim 7 wherein the degradable polymer comprises a second degradable material selected from the group consisting of polysaccharides, chitins, chitosans, proteins, aliphatic polyesters, poly(lactides), poly(glycolides), poly($\epsilon$-caprolactones), poly(hydroxybutyrates), polyanhydrides, aliphatic polycarbonates, poly(amino acids), poly(ethylene oxides), polyphosphazenes, and combinations thereof.

9. The method of claim 1 wherein the degradable material further comprises a plasticizer.

10. The method of claim 7 wherein the dehydrated salt comprises anhydrous sodium tetraborate or anhydrous boric acid.

11. The method of claim 1 wherein the degradable material further comprises poly(lactic acid) and a compound chosen from the group consisting of sodium borate and boric oxide.

12. The method of claim 1 wherein the degradable material further comprises a stereoisomer of a poly(lactide).

13. The method of claim 1 wherein the proppant composition comprises a poly(lactic acid) degradable material and bauxite proppant particulates, the bauxite proppant particulates at least partially coated with a curable epoxy resin.

14. The method of claim 1 wherein the degradable material is present in the proppant composition in an amount sufficient to create a desirable number of voids in the proppant matrix.

15. The method of claim 1 wherein the degradable material is present in the proppant composition in an amount of about 0.1% to about 30% by weight of proppant particulates in the composition.

16. The method of claim 1 wherein the degradable material further comprises particles having a rod-like shape.

17. The method of claim 1 wherein the degradable material further comprises an inorganic or organic compound.

18. The method of claim 17 wherein the inorganic or organic compound is selected from the group consisting of sodium acetate trihydrate, L-tartaric acid disodium, salt dihydrate, sodium citrate dihydrate, hydrate of an inorganic acid, hydrate of an inorganic acid salt, sodium tetraborate decahydrate, sodium hydrogenphosphate heptahydrate, sodium phosphate, dodecahydrate, amylose, starch-based hydrophilic polymer, cellulose-based hydrophilic polymers, and combinations thereof.

19. The method of claim 1 wherein the degradable material is a composite.

20. A method of enhancing the permeability of a proppant matrix comprising the step of introducing a plurality of voids into the proppant matrix by a degradation of a degradable material that comprises one or more poly(orthoesters) within the proppant matrix.

21. The method of claim 20 wherein the proppant matrix comprises a material selected from the group consisting of sand, walnut hulls, man-made proppant particulates, and combinations thereof.

22. The method of claim 20 wherein the proppant matrix comprises a curable resin, a tackifying agent, or both.

23. The method of claim 22 wherein the curable resin is selected from the group consisting of epoxies, furans, phenolics, furfuryl aldehydes, furfuryl alcohols, and combinations thereof.

24. The method of claim 20 wherein the proppant matrix comprises interlocking proppant particulates.

25. The method of claim 20 wherein the degradable material further comprises a degradable polymer or a dehydrated salt.

26. The method of claim 25 wherein the degradable polymer is selected from the group consisting of polysaccharides, chitins, chitosans, proteins, aliphatic polyesters, poly(lactides), poly(glycolides), poly($\epsilon$-caprolactones), poly(hydroxybutyrates), polyanhydrides, aliphatic polycarbonates, poly(amino acids), poly(ethylene oxides), polyphosphazenes, and combinations thereof.

27. The method of claim 20 wherein the degradable material further comprises a plasticizer.

28. The method of claim 25 wherein the dehydrated salt is selected from the group consisting of anhydrous sodium tetraborate, anhydrous boric acid, and combinations thereof.

29. The method of claim 20 wherein the degradable material further comprises poly(lactic acid) and a compound chosen from the group consisting of sodium borate and boric oxide.

30. The method of claim 20 wherein the degradable material further comprises a stereoisomer of a poly(lactide).

31. The method of claim 20 wherein the proppant matrix comprises a poly(lactic acid) degradable material and bauxite proppant particulates, the bauxite proppant particulates being at least partially coated with a curable epoxy resin.

32. The method of claim 20 wherein the degradable material is present in the proppant matrix in an amount sufficient to create a desirable number of voids in the proppant matrix.

33. The method of claim 20 wherein the degradable material is present in the proppant matrix in an amount of about 0.1% to about 30% by weight of the proppant matrix.

34. The method of claim 20 wherein the degradable material comprises particles having a rod-like shape.

35. The method of claim 20 wherein at least a portion of the voids in the proppant matrix are channel-like in shape.

36. The method of claim 20 wherein the proppant matrix has a conductivity equal to or greater than 4500 darcies at a pressure of about 2000 psi.

37. The method of claim 20 wherein the proppant matrix has a conductivity equal to or greater than 4500 darcies at a pressure of about 4000 psi.

38. The method of claim 20 wherein the proppant matrix has a conductivity equal to or greater than 4000 darcies at a pressure of about 6000 psi.

39. A method of increasing the conductivity of a fracture in a subterranean formation comprising the steps of:
providing a fracturing treatment fluid comprising a proppant composition, the proppant composition comprising proppant particulates and a degradable composite material that comprises one or more poly(orthoesters);
introducing the proppant composition to the fracture; and
allowing the proppant composition to form in the fracture a proppant matrix having voids.

40. The method of claim 39 wherein the proppant particulates are selected from the group consisting of sand, walnut hulls, man-made proppant particulates, and combinations thereof.

41. The method of claim 39 wherein the proppant particulates have a size of about 10 to about 60 US mesh.

42. The method of claim 39 wherein the proppant composition further comprises a curable resin, a tackifying agent, or both.

43. The method of claim 42 wherein the curable resin is selected from the group consisting of epoxies, furans, phenolics, furfuryl aldehydes, furfuryl alcohols, and combinations thereof.

44. The method of claim 39 wherein the proppant composition comprises interlocking proppant particulates.

45. The method of claim 39 wherein the degradable composite material further comprises a degradable polymer or a dehydrated salt.

46. The method of claim 45 wherein the degradable polymer is selected from the group consisting of polysaccharides, chitins, chitosans, proteins, aliphatic polyesters, poly(lactides), poly(glycolides), poly($\epsilon$-caprolactones), poly(hydroxybutyrates), polyanhydrides, aliphatic polycarbonates, poly(amino acids), poly(ethylene oxides), polyphosphazenes, and combinations thereof.

47. The method of claim 45 wherein the dehydrated salt is selected from the group consisting of anhydrous sodium tetraborate or anhydrous boric acid, and combinations thereof.

48. The method of claim 39 wherein the degradable composite material further comprises poly(lactic acid) and a compound chosen from the group consisting of sodium borate and boric oxide.

49. The method of claim 39 wherein the degradable composite material further comprises a stereoisomer of a poly(lactide).

50. The method of claim 39 wherein the proppant composition comprises a poly(lactic acid) degradable material and bauxite proppant particulates, the bauxite proppant particulates being at least partially coated with a curable epoxy resin.

51. The method of claim 39 wherein the degradable composite material is present in the proppant composition in an amount sufficient to create a desirable number of voids in the proppant matrix.

52. The method of claim 39 wherein the degradable composite material is present in the proppant composition in an amount of about 0.1% to about 30% by weight of proppant particulates in the composition.

53. The method of claim 39 wherein the degradable composite material further comprises particles having a rod-like shape.

54. The method of claim 39 wherein the degradable composite material further comprises an inorganic or organic compound.

55. The method of claim 54 wherein the inorganic or organic compound is selected from the group consisting of sodium acetate trihydrate, L-tartaric acid disodium, salt dihydrate, sodium citrate dihydrate, hydrate of an inorganic acid, hydrate of an inorganic acid salt, sodium tetraborate decahydrate, sodium hydrogenphosphate heptahydrate, sodium phosphate, dodecahydrate, amylose, starch-based hydrophilic polymers, cellulose-based hydrophilic polymers, and combinations thereof.

56. A method of enhancing the permeability of a proppant matrix comprising the step of introducing a plurality of voids into the proppant matrix by a degradation of a degradable composite material within the proppant matrix.

57. The method of claim 56 wherein the proppant matrix comprises a material selected from the group consisting of sand, walnut hulls, man-made proppant particulates, and combinations thereof.

58. The method of claim 56 wherein the proppant matrix comprises a curable resin, a tackifying agent, or both.

59. The method of claim 58 wherein the curable resin is selected from the group consisting of epoxies, furans, phenolics, furfuryl aldehydes, furfuryl alcohols, and combinations thereof.

60. The method of claim 56 wherein the proppant matrix comprises interlocking proppant particulates.

61. The method of claim 56 wherein the degradable composite material further comprises a degradable polymer or a dehydrated salt.

62. The method of claim 61 wherein the degradable polymer is selected from the group consisting of polysaccharides, chitins, chitosans, proteins, aliphatic polyesters, poly(lactides), poly(glycolides), poly($\epsilon$-caprolactones), poly(hydroxybutyrates), polyanhydrides, aliphatic polycarbonates, poly(amino acids), poly(ethylene oxides), polyphosphazenes, and combinations thereof.

63. The method of claim 62 wherein the dehydrated salt is selected from the group consisting of anhydrous sodium tetraborate, anhydrous boric acid, and combinations thereof.

64. The method of claim 56 wherein the degradable composite material further comprises poly(lactic acid) and a compound chosen from the group consisting of sodium borate and boric oxide.

65. The method of claim 56 wherein the degradable composite material further comprises a stereoisomer of a poly(lactide).

66. The method of claim 56 wherein the proppant matrix comprises a poly(lactic acid) degradable material and bauxite proppant particulates, the bauxite proppant particulates being at least partially coated with a curable epoxy resin.

67. The method of claim 56 wherein the degradable material is present in the proppant matrix in an amount sufficient to create a desirable number of voids in the proppant matrix.

68. The method of claim 56 wherein the degradable composite material is present in the proppant matrix in an amount of about 0.1% to about 30% by weight of the proppant matrix.

69. The method of claim 56 wherein the degradable composite material comprises particles having a rod-like shape.

70. The method of claim 56 wherein at least a portion of the voids in the proppant matrix are channel-like in shape.

71. The method of claim 56 wherein the proppant matrix has a conductivity equal to or greater than 4500 darcies at a pressure of about 2000 psi.

72. The method of claim 56 wherein the proppant matrix has a conductivity equal to or greater than 4500 darcies at a pressure of about 4000 psi.

73. The method of claim 56 wherein the proppant matrix has a conductivity equal to or greater than 4000 darcies at a pressure of about 6000 psi.

* * * * *